United States Patent
Kammachi Sreedhar et al.

(10) Patent No.: US 11,943,421 B2
(45) Date of Patent: Mar. 26, 2024

(54) METHOD, AN APPARATUS AND A COMPUTER PROGRAM PRODUCT FOR VIRTUAL REALITY

(71) Applicant: Nokia Technologies Oy, Espoo (FI)

(72) Inventors: Kashyap Kammachi Sreedhar, Tampere (FI); Igor Danilo Diego Curcio, Tampere (FI); Miska Matias Hannuksela, Tampere (FI); Sujeet Shyamsundar Mate, Tampere (FI); Emre Baris Aksu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/726,194

(22) Filed: Apr. 21, 2022

(65) Prior Publication Data
US 2022/0247990 A1 Aug. 4, 2022

Related U.S. Application Data

(63) Continuation of application No. 16/731,610, filed on Dec. 31, 2019, now Pat. No. 11,323,683.
(Continued)

(51) Int. Cl.
*H04N 13/172* (2018.01)
*H04N 13/161* (2018.01)

(52) U.S. Cl.
CPC ......... *H04N 13/172* (2018.05); *H04N 13/161* (2018.05)

(58) Field of Classification Search
CPC .............. H04N 13/172; H04N 13/161; H04N 21/23424; H04N 21/234345;
(Continued)

(56) References Cited

U.S. PATENT DOCUMENTS

| 7,302,490 B1* | 11/2007 | Gupta | .................. H04L 65/764 |
| | | | 726/32 |
| 2007/0006061 A1* | 1/2007 | Colle | ............... H04N 21/43074 |
| | | | 715/255 |

(Continued)

FOREIGN PATENT DOCUMENTS

| CN | 107888939 A | 4/2018 |
| CN | 107888993 A | 4/2018 |

(Continued)

OTHER PUBLICATIONS

"Information Technology—Coding of Audio-Visual-Objects—Part 12: ISO Base Media File Format", ISO/IEC 14496-12, Fifth edition, Dec. 15, 2015, 248 pages.

(Continued)

*Primary Examiner* — Richard A Hansell, Jr.
(74) *Attorney, Agent, or Firm* — Joseph C. Drish; Harrington & Smith

(57) ABSTRACT

A method includes generating a bitstream defining a presentation, the presentation comprising an omnidirectional visual media content and a first visual media component and a second visual media component; indicating in the bitstream a first presentation timeline and a second presentation timeline; and indicating in the bitstream a switching mode with respect to the first presentation timeline associated with the first visual media component, or with respect to the second presentation timeline associated with the second visual media component, the switching mode being indicated dependent on a viewpoint of a user; wherein the switching mode provides an indication of switching to the first visual media component or to the second visual media (Continued)

component, the first visual media component corresponding to content captured from a first omnidirectional camera in a first location, and the second visual media component corresponding to content captured from a second omnidirectional camera in a second location.

28 Claims, 8 Drawing Sheets

Related U.S. Application Data

(60) Provisional application No. 62/789,614, filed on Jan. 8, 2019.

(58) Field of Classification Search
CPC ......... H04N 21/85406; H04N 21/8547; H04N 21/816; H04N 21/4402; H04N 21/4325; H04N 21/8456
See application file for complete search history.

(56) References Cited

U.S. PATENT DOCUMENTS

| | | | | |
|---|---|---|---|---|
| 2013/0188923 | A1* | 7/2013 | Hartley | H04N 21/44016 386/241 |
| 2014/0122485 | A1* | 5/2014 | Shyamsundar | G06F 16/48 707/737 |
| 2015/0215359 | A1 | 7/2015 | Bao et al. | |
| 2017/0374120 | A1* | 12/2017 | Vishnia | H04L 65/75 |
| 2018/0115807 | A1 | 4/2018 | Todorovic et al. | |
| 2018/0164593 | A1* | 6/2018 | Van Der Auwera | G06F 3/013 |
| 2018/0302689 | A1* | 10/2018 | Todorovic | H04N 21/4622 |
| 2018/0332267 | A1* | 11/2018 | Hesla | H04N 5/9201 |
| 2019/0158815 | A1* | 5/2019 | He | H04N 19/39 |
| 2019/0230388 | A1* | 7/2019 | Di | H04N 21/2662 |
| 2019/0306519 | A1* | 10/2019 | Chen | H04N 21/85406 |
| 2019/0313081 | A1* | 10/2019 | Oh | H04N 21/235 |
| 2020/0014906 | A1* | 1/2020 | Wang | G06V 20/46 |
| 2021/0006614 | A1* | 1/2021 | Oyman | H04N 19/30 |

FOREIGN PATENT DOCUMENTS

| | | | | |
|---|---|---|---|---|
| CN | 108089701 A | | 5/2018 | |
| GB | 2570298 A | | 7/2019 | |
| WO | WO-2017205794 A1 | * | 11/2017 | ........... H04N 13/117 |
| WO | WO-2018058993 A1 | * | 4/2018 | ......... H04N 21/2343 |

OTHER PUBLICATIONS

"Information Technology—Coding of Audio-Visual-Objects—Part 14: MP4 File Format" ISO/IEC 14496-14, First edition, Nov. 15, 2003, 18 pages.

"Information Technology—Coding of Audio-Visual-Objects—Part 15: Advanced Video Coding (AVC) file format" ISO/IEC 14496-15, First Edition, Apr. 15, 2004, 29 pages.

"Information Technology—Coded Representation of Immersive Media—Part2: Omnidirectional Media Format" ISO/IEC 23090-2 First Edition, Jan. 2019, 19 pages.

$3^{rd}$ Generation Partnership Project; Technical Specification Group Services and System Aspects; Transparent end-to-end Packet-Switched Streaming Serive (PSS); Protocols and Codecs (Release 15) 3GPP TS 26.234, V15.1.0, Sep. 2018, pp. 1-174.

"Information Technology—Dynamic Adaptive Streaming over HTTP (DASH)—Part 1: Media Presentation Description and Segment Formats" ISO/IEC 23009-1, Second Edition, May 15, 2014, 152 Pages.

Moats, "URN Syntax" RFC 2141, Network Working Group, May 1997, pp. 1-7.

Berners-Lee et al. Uniform Resource Identifier (URI): Generic Syntax, RFC 3986, Network Working Group, Jan. 2005. pp. 1-61.

U.S. Appl. No. 62/738,343 "Method and Apparatus for Enabling Multiple Timeline Support for Omnidirectional Content Playback" filed Sep. 28, 2018, pp. 1-56.

Extended European Search Report received for corresponding European Patent Application No. 20150199.6 dated Apr. 15, 2020, 9 pages.

Mate et al. "[OMAF] Signaling for Presentation Timeline and Overlay Playback Control" Nokia, ISO/TEC JTC1/SC29/WG11, MPEG2019/m45888, Jan. 2019, 3 pages.

Curcio et al. "[OMAF] Switching Viewpoints with Different Timelines" Nokia, ISO/IEC JTC1/SC29/WG11 MPGEG2019/M46461, Jan. 2019, 4 pages.

Wang et al. "WD3 of ISO/IEC 23090-2 OMAF $2^{nd}$ Edition" Systems, ISO/TEC JTC1/SC29/WG11, N17963-v1, Oct. 2018, 226 pages.

\* cited by examiner

METHOD, AN APPARATUS AND A COMPUTER PROGRAM PRODUCT FOR VIRTUAL REALITY

RELATED APPLICATION

This application is a continuation of U.S. patent application Ser. No. 16/731,610, filed Dec. 31, 2019, which is incorporated herein by reference in its entirety, which claims priority to U.S. Provisional Patent Application No. 62/789,614, filed Jan. 8, 2019, which is incorporated herein by reference in its entirety.

TECHNICAL FIELD

The present solution generally relates to virtual reality.

BACKGROUND

Since the beginning of photography and cinematography, the most common type of image and video content has been captured by cameras with relatively narrow field of view and displayed as a rectangular scene on flat displays. Such content is referred as "flat content", or "flat image", or "flat video" in this application. The cameras are mainly directional, whereby they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

Now there has been invented an improved method and technical equipment implementing the method, for encoding and decoding. Various aspects of the invention include a method, an apparatus, and a computer readable medium comprising a computer program stored therein, which are characterized by what is stated in the independent claims. Various embodiments of the invention are disclosed in the dependent claims.

According to a first aspect, there is provided a method comprising generating a bitstream defining a presentation, the presentation comprising an omnidirectional visual media content and a first visual media component and a second visual media component; indicating in the bitstream a first presentation timeline associated with the first visual media component; indicating in the bitstream a second presentation timeline associated with the second visual media component; indicating in the bitstream a switching mode to a second presentation timeline associated with the second visual media component; and indicating in the bitstream, that the switching mode is with respect to the first presentation timeline or to the second presentation timeline.

According to a second aspect, there is provided an apparatus comprising a processor, a memory, and a computer program code residing in the memory, wherein the computer code when executed by the processor, is configured to cause the apparatus to generate a bitstream defining a presentation, the presentation comprising an omnidirectional visual media content and a first visual media component and a second visual media component; indicate in the bitstream a first presentation timeline associated with the first visual media component; indicate in the bitstream a second presentation timeline associated with the second visual media component; indicate in the bitstream a switching mode to a second presentation timeline associated with the second visual media component; and indicate in the bitstream, that the switching mode is with respect to the first presentation timeline or to the second presentation timeline.

According to a third aspect, there is provided a method comprising determining from a bitstream a presentation, the presentation comprising an omnidirectional visual media content and a first visual media component and a second visual media component; decoding from the bitstream a first presentation timeline associated with the first visual media component; decoding from the bitstream a second presentation timeline associated with the second visual media component; decoding from the bitstream a switching mode to a second presentation timeline associated with the second visual media component; and decoding from the bitstream, that the switching mode is with respect to the first presentation timeline or to the second presentation timeline.

According to a fourth aspect, there is provided an apparatus comprising a processor, a memory, and a computer program code residing in the memory, wherein the computer code when executed by the processor, is configured to cause the apparatus to determine from a bitstream a presentation, the presentation comprising an omnidirectional visual media content and a first visual media component and a second visual media component; decode from the bitstream a first presentation timeline associated with the first visual media component; decode from the bitstream a second presentation timeline associated with the second visual media component; decode from the bitstream a switching mode to a second presentation timeline associated with the second visual media component; and decode from the bitstream, that the switching mode is with respect to the first presentation timeline or to the second presentation timeline.

According to a fifth aspect, there is provided a computer program product embodied on a computer readable medium, comprising computer program code configured to, when executed on at least one processor, cause an apparatus or a system to generate a bitstream defining a presentation, the presentation comprising an omnidirectional visual media content and a first visual media component and a second visual media component; indicate in the bitstream a first presentation timeline associated with the first visual media component; indicate in the bitstream a second presentation timeline associated with the second visual media component; indicate in the bitstream a switching mode to a second presentation timeline associated with the second visual media component; and indicate in the bitstream, that the switching mode is with respect to the first presentation timeline or to the second presentation timeline.

According to a sixth aspect, there is provided a computer program product embodied on a computer readable medium, comprising computer program code configured to, when executed on at least one processor, cause an apparatus or a system to determine from a bitstream a presentation, the presentation comprising an omnidirectional visual media content and a first visual media component and a second visual media component; decode from the bitstream a first presentation timeline associated with the first visual media component; decode from the bitstream a second presentation timeline associated with the second visual media component; decode from the bitstream a switching mode to a second presentation timeline associated with the second visual media component; and decode from the bitstream, that the switching mode is with respect to the first presentation timeline or to the second presentation timeline.

According to an embodiment, a master presentation timeline or an indication to create a player presentation timeline is indicated in/decoded from the bitstream; and indicating in/decoding from the bitstream, that the switching mode is with respect to the first presentation timeline or to the second presentation timeline or to the master presentation timeline or the player presentation timeline.

According to an embodiment, a retrieval mechanism of a second visual media component is indicated in/decoded from a bitstream.

According to an embodiment, the information on the switching mode in included into a container format.

According to an embodiment, the computer program product is embodied on a non-transitory computer readable medium.

DESCRIPTION OF THE DRAWINGS

In the following, various embodiments of the invention will be described in more detail with reference to the appended drawings, in which.

DESCRIPTION OF EXAMPLE EMBODIMENTS

Figure 1:
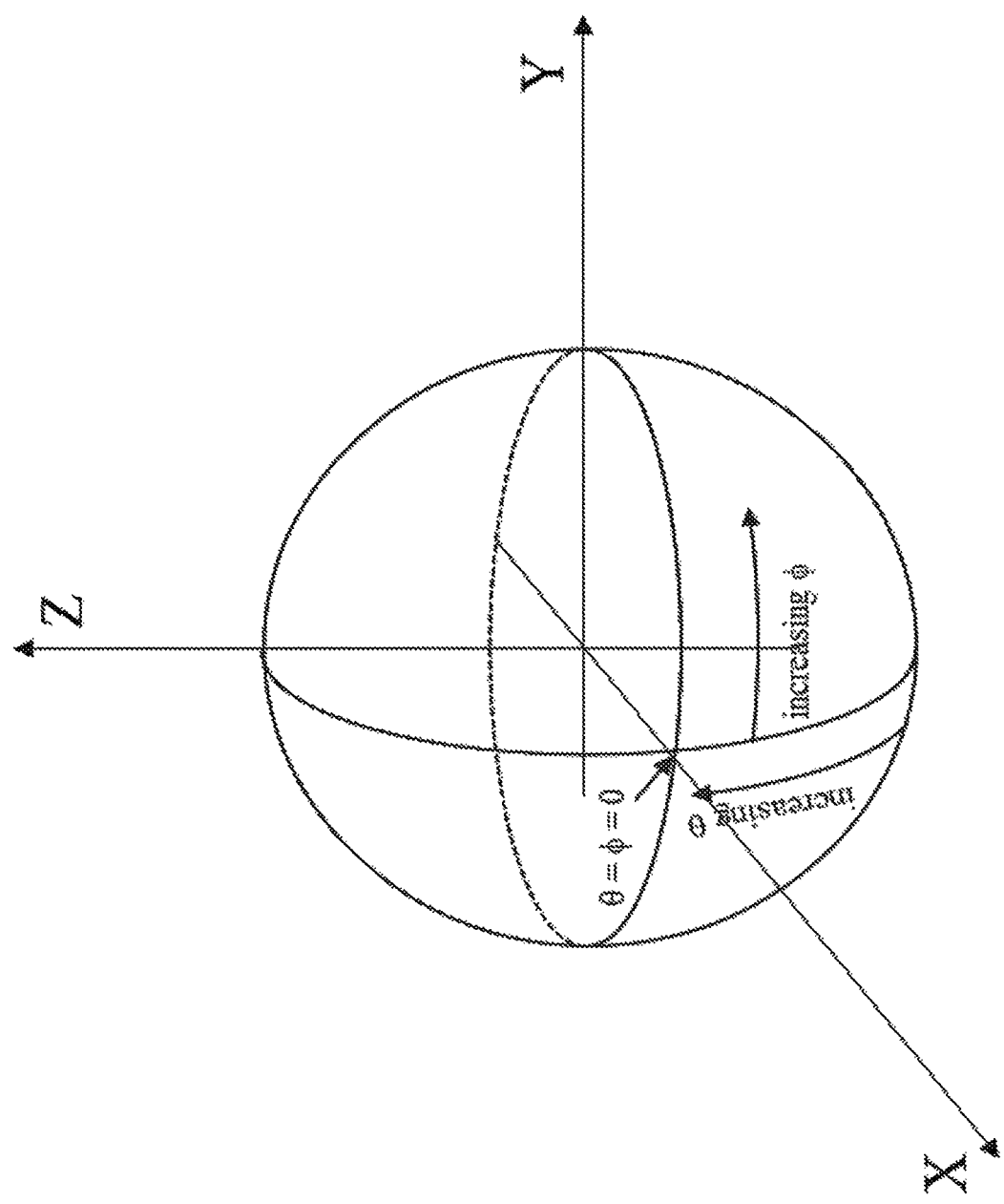
FIG. 1 shows an example of the relation of the sphere coordinates to azimuth and elevation to the X, Y, and Z coordinate axes.

In the following, several embodiments of the invention will be described in the context of immersive multimedia, i.e. virtual reality, such as omnidirectional content. The consumption of omnidirectional content is more complex for an end user compared to the consumption of 2D content. This is due to the higher degree of freedom available to the end user. This freedom also results in more uncertainty. The situation is further complicated when layers of content are rendered, e.g., in case of overlays.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15) and High Efficiency Video Coding standard (HEVC or H.265/HEVC).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. Box type may be identified by an unsigned 32-bit integer, interpreted as a four character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO base media file format, a file includes media data and metadata that are encapsulated into boxes.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'rnoov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derive from generic classes (e.g. VisualSampleEntry, AudioSampleEntry). Which type of sample entry form is used for derivation the track-type specific sample entry format is determined by the media handler of the track.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used, and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited, and the use cases mentioned above be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

A media segment may comprise one or more self-contained movie fragments. A media segment may be used for delivery, such as streaming, e.g. in MPEG-DASH.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping.

Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping. A default sample group entry may be given in a SampleGroupDescriptionBox, applying to all samples that are not mapped in any SampleToGroupBox of the same sample grouping.

In ISOMBFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, the EditListBox, is provided below:

```
aligned(8) class EditListBox extends
FullBox('elst' , version, flags) {
    unsigned int(32) entry_count;
        for (i=1; i <= entry_count; i++) {
            if (version==1) {
                unsigned int(64) segment_duration;
                int(64) media_time;
            } else { // version==0
                unsigned int(32) segment_duration;
                int(32) media_time;
            }
            int(16) media_rate_integer;
            int(16) media_rate_fraction = 0;
        }
}
```

In ISOBMFF, an EditListBox may be contained in EditBox, which is contained in TrackBox ('trak').

In this example of the edit list box, flags specifies the repetition of the edit list. By way of example, setting a specific bit within the box flags (the least significant bit, i.e., flags & 1 in ANSI-C notation, where & indicates a bit-wise AND operation) equal to 0 specifies that the edit list is not repeated, while setting the specific bit (i.e., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) shall be equal to zero. When the edit list is repeated, the media at time 0 resulting from the edit list follows immediately the media having the largest time resulting from the edit list such that the edit list is repeated seamlessly.

In ISOBMFF, a Track group enables grouping of tracks based on certain characteristics or the tracks within a group have a particular relationship. Track grouping, however, does not allow any image items in the group.

The syntax of TrackGroupBox in ISOBMFF is as follows

```
aligned(8) class TrackGroupBox extends Box('trgr') {
}
aligned(8) class TrackGroupTypeBox(unsigned int(32)
track_group_type) extends
FullBox(track_group_type, version = 0, flags = 0)
{
    unsigned int(32) track_group_id;
```

```
        // the remaining data may be specified for a particular
        track_group_type
    }
``` track_group_type indicates the grouping_type and shall be set to one of the following values, or a value registered, or a value from a derived specification or registration: 'msrc' indicates that this track belongs to a multi-source presentation.

The tracks that have the same value of track_group_id within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant.

The pair of track_group_id and track_group_type identifies a track group within the file. The tracks that contain a particular TrackGroupTypeBox having the same value of track_group_id and track_group_type belong to the same track group.

The Entity grouping is similar to track grouping but enables grouping of both tracks and image items in tha same group.

The syntax of EntityToGroupBox in ISOBMFF is as follows.

```
    aligned(8) class EntityToGroupBox(grouping_type, version, flags)
    extends FullBox(grouping_type, version, flags) {
        unsigned int(32) group_id;
        unsigned int(32) num_entities_in_group;
        for(i=0; i<num_entities_in_group; i++)
            unsigned int(32) entity_id;
    }
``` group_id is a non-negative integer assigned to the particular grouping that shall not be equal to any group_id value of any other EntityToGroupBox, any item ID value of the hierarchy level (file, movie, or track) that contains the GroupsListBox, or any track ID value (when the GroupsListBox is contained in the file level).

num_entities_in_group specifies the number of entity_id values mapped to this entity group.

entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using XML syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource; the resource can be formed by concatenating the extents.

The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

High Efficiency Image File Format (HEIF) is a standard developed by the Moving Picture Experts Group (MPEG) for storage of images and image sequences. Among other things, the standard facilitates file encapsulation of data coded according to High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with auxiliary image such as an alpha plane. A cover image among the collection of images is indicated using the 'pitm' box. A thumbnail image or an auxiliary image is linked to the primary image item using an item reference of type 'thmb' or 'auxl', respectively.

An entity may be defined as a collective term of a track or an item. An entity group is a grouping of items, which may also group tracks. An entity group can be used instead of item references, when the grouped entities do not have clear dependency or directional reference relation. The entities in an entity group share a particular characteristic or have a particular relationship, as indicated by the grouping type.

An entity group is a grouping of items, which may also group tracks. The entities in an entity group share a particular characteristic or have a particular relationship, as indicated by the grouping type.

Entity groups are indicated in GroupsListBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track.

GroupsListBox contains EntityToGroupBoxes, each specifying one entity group. The syntax of EntityToGroupBox is specified as follows:

```
aligned(8) class EntityToGroupBox(grouping_type,
version, flags)
extends FullBox(grouping_type, version, flags) {
    unsigned int(32) group_id;
    unsigned int(32) num_entities_in_group;
    entity_id for(i=0; i<num_entities_in_group; i++)
        unsigned int(32) entity_id;
// the remaining data may be specified for a
particular grouping_type
}
``` entity_id is resolved to an item, when an item with item_ID equal to entity_id is present in the hierarchy level (file, movie or track) that contains the GroupsListBox, or to a track, when a track with track_ID equal to is present and the GroupsListBox is contained in the file level.

TrackGroupBox, which is contained in Trackbox, enables indication of groups of tracks, where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group. The syntax of the contained boxes is defined through TrackGroupTypeBox is follows:

```
aligned(8) class TrackGroupTypeBox(unsigned int(32)
track_group_type) extends
FullBox(track_group_type, version = 0, flags = 0)
{
    unsigned int(32) track_group_id;
    // the remaining data may be specified for a particular
    track_group_type
}
```

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested.

A Segment Element of Matroska is a container for other top-level (level 1) elements. A Matroska file may comprise (but is not limited to be composed of) one Segment. Multimedia data in Matroska files is organized in Clusters (or Cluster Elements), wherein each may contain a few seconds of multimedia data. A Cluster comprises BlockGroup elements, which in turn comprise Block Elements. A Cues Element comprises metadata which may assist in random access or seeking and may include file pointers or respective timestamps for seek points.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). MPEG DASH and 3GP-DASH are technically close to each other and may therefore be collectively referred to as DASH.

Some concepts, structures, and specifications of DASH are described below as an example of a container file format, based on which the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof that may differ by the encoding choice, e.g. by bitrate, resolution, language, codec, etc. The Segment contains certain duration of media data, and metadata to decode and present the included media content. A Segment is identified by a URI and may be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute, for example. To point to a specific attribute @attribute contained in an element Element, one may write Element@attribute. If an attribute's name consists of two or more combined words, camel-casing may be used after the first word, such as @veryImportantAttribute, for example. Attributes may have assigned a status in the XML as mandatory (M), optional (O), optional with default value (OD) and conditionally mandatory (CM).

In DASH, all descriptor elements may be structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

MPEG-DASH specifies a Viewpoint element that is formatted as a property descriptor. The @schemeIdUri attribute of the Viewpoint element is used to identify the viewpoint scheme employed. Adaptation Sets containing non-equivalent Viewpoint element values contain different media content components. The Viewpoint elements may equally be applied to media content types that are not video. Adaptation Sets with equivalent Viewpoint element values are intended to be presented together. This handling should be applied equally for recognized and unrecognized @schemeIdUri values.

SRD (Spatial Relationship Description) is specified in the nonnative Annex H of MPEG-DASH. The following contains some excerpts of the SRD specification.

The SRD scheme allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile).

The SupplementalProperty and/or EssentialProperty descriptors with @schemeIdUri equal to "urn:mpeg:dash:srd:2014" are used to provide spatial relationship information associated to the containing Spatial Object. SRD shall be contained exclusively in these two MPD elements (AdaptationSet and SubRepresentation).

Sub-Representation level SRDs may be used to represent Spatial Objects in one Representation such as HEVC tiling streams. In that case, SRD descriptors may be present at Adaptation Set as well as Sub-Representation levels.

The @value of the SupplementalProperty or EssentialProperty elements using the SRD scheme is a comma separated list of values for SRD parameters. The SRD parameters source_id, object_x, object_y, object_width, and object_height are required to be present and the SRD parameters total_width, total_height, and spatial_set_id are conditionally or optionally present.

source_id is a non-negative integer in decimal representation providing the identifier for the source of the content. The source_id parameter provides a unique identifier, within the Period, for the source of the content. It implicitly defines a coordinate system associated to this source. This coordinate system uses an arbitrary origin (0; 0); the x-axis is oriented from left to right and the y-axis from top to bottom. All SRD sharing the same source_id value have the same origin and axes orientations. Spatial relationships for Spatial Objects using SRD with different source_id values are undefined.

For a given source_id value, a reference space is defined, corresponding to the rectangular region encompassing the entire source content, whose top-left corner is at the origin of the coordinate system. The total_width and total_height values in a SRD provide the size of this reference space expressed in arbitrary units. total_width is a non-negative integer in decimal representation expressing the width of the reference space in arbitrary units. total_height is a non-negative integer in decimal representation expressing the height of the reference space in arbitrary units. It is allowed that there is no Spatial Object in the MPD that covers the entire source of the content, e.g. when the entire source content is represented by two separate videos.

object_x is a non-negative integer in decimal representation expressing the horizontal position of the top-left corner of the Spatial Object in arbitrary units. object_y is a non-negative integer in decimal representation expressing the vertical position of the top-left corner of the Spatial Object in arbitrary units. object_width is a non-negative integer in decimal representation expressing the width of the Spatial Object in arbitrary units. object_height is a non-negative integer in decimal representation expressing the height of the Spatial Object in arbitrary units. The object_x and object_y parameters (respectively object_width and object_height) express 2D positions (respectively 2D sizes) of the associated Spatial Object in the coordinate system associated to the source. The values of the object_x, object_y, object_width, and object_height parameters are relative to the values of the total_width and total_height parameters, as defined above. Positions (object_x, object_y) and sizes (object_width, object_height) of SRDs sharing the same source_id value may be compared after taking into account the size of the reference space, i.e. after the object_x and object_width values are divided by the total_width value and the object_y and object_height values divided by the total_height value of their respective descriptors. Different total_width and total_height values may be used in different descriptors to provide positions and sizes information in different units for the same reference space.

spatial_set_id is a non-negative integer in decimal representation providing an identifier for a group of Spatial Objects. When not present, the Spatial Object associated to this descriptor does not belong to any spatial set and no spatial set information is given. MPD authors can express, using the spatial_set_id parameter, that some Spatial Objects, within a given source_id, have a particular spatial relationship. For instance, an MPD author may group all Adaptation Sets corresponding to tiles at a same resolution level. This way, the spatial_set_id parameter may be used by the DASH client to quickly select spatially related Spatial Objects.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration may be a lower bound on the end-to-end latency perceived by a DASH client since a Segment is a discrete unit of generating media data for DASH. Content generation may be done such a manner that a whole Segment of media data is made available for a server. Furthermore, many client implementations use a Segment as the unit for GET requests. Thus, in arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment or spread among many indexing boxes in the segment. Different methods of spreading are possible, such as hierarchical, daisy chain, and hybrid. This technique may avoid adding a large box at the beginning of the segment and therefore may prevent a possible initial download delay.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements. In case the @level attribute is present in the SubRepresentation element, the following applies:

Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate;

The Initialization Segment and/or the Media Segments and/or the Index Segments shall provide sufficient information such that the data can be easily accessed through HTTP partial GET requests. The details on providing such information are defined by the media format in use.

When ISOBMFF Segments are used, the following applies:
  The Initialization Segment contains the Level Assignment box.
  The Subsegment Index box ('ssix') is present for each Subsegment.
  The attribute @level specifies the level to which the described Sub-Representation is associated to in the Subsegment Index. The information in Representation, Sub-Representation and in the Level Assignment ('leva') box contains information on the assignment of media data to levels.
  Media data should have an order such that each level provides an enhancement compared to the lower levels.

If the @level attribute is absent, then the SubRepresentation element is solely used to provide a more detailed description for media streams that are embedded in the Representation. The ISOBMFF includes the so-called level mechanism to specify subsets of the file. Levels follow the dependency hierarchy so that samples mapped to level n may depend on any samples of levels m, where m<=n, and do not depend on any samples of levels p, where p>n. For example, levels can be specified according to temporal sub-layer (e.g., TemporalId of HEVC). Levels may be announced in the Level Assignment ('leva') box contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction is assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. That is, HEVC pictures of a certain TemporalId value may be mapped to a particular temporal level using the Temporal Level sample grouping (and the same can be repeated for all TemporalId values). The Level Assignment box can then refer to the Temporal Level sample grouping in the indicated mapping to levels.

The Subsegment Index box ('ssix') provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros. If not, the sample data for samples assigned to levels that are not accessed is not present, and care should be taken.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

Omnidirectional Media Format (OMAF), formally referred to as ISO/IEC 23090-2, is a standard developed by the Moving Picture Experts Group (MPEG), formally referred to as ISO/IEC JTC1/SC29/WG11. The first version of OMAF, hereafter referred to as OMAF v1, was technically finalized late 2017. At the time of writing this disclosure, the work towards an amendment of OMAF v2 has been initiated. Some key definitions and concepts of OMAF are described in this section as an example, wherein the embodiments may be implemented. The aspects of the invention are not limited to OMAF or its extensions, but rather the description is given for one possible basis on top of which the invention may be partly or fully realized.

OMAF defines a media format by extending ISOBMFF, HEIF, and DASH for enabling omnidirectional media applications that focus on 360-degree content (e.g. video, images, audio, text). OMAF relates to omnidirectional streaming of single 3DoF content, where the viewer is located at the centre of the unit sphere and has three degrees of freedom (Yaw-Pitch-Roll). The next phase of standardization (MPEG-I Phase 1b) may enable multiple 3DoF and 3DoF+ content consumption as well as overlay support with user interaction.

OMAF specifies a coordinate system that consists of a unit sphere and three coordinate axes, i.e. the X (back-to-front) axis, the Y (lateral, side-to-side) axis, and the Z (vertical, up) axis, where the three axes cross at the centre of the sphere.

The location of a point on the unit sphere is identified by a pair of sphere coordinates azimuth ($\phi$) and elevation ($\theta$). FIG. 1 illustrates the relation of the sphere coordinates azimuth ($\phi$) and elevation ($\theta$) to the X, Y, and Z coordinate axes. The value ranges of azimuth is −180.0, inclusive, to 180.0, exclusive, degrees. The value range of elevation is −90.0 to 90.0, inclusive, degrees.

Global coordinate axes may be defined as coordinate axes, e.g. according to the coordinate system as discussed above, that are associated with audio, video, and images representing the same acquisition position and intended to be rendered together. The origin of the global coordinate axes is usually the same as the center point of a device or rig used for omnidirectional audio/video acquisition as well as the position of the observer's head in the three-dimensional space in which the audio and video tracks are located.

360-degree panoramic or omnidirectional three-degrees-of-freedom (3DoF) content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases, panoramic content with 360-degree horizontal field-of-view but with less than 180-degree vertical field-of-view may be considered special cases of equirectangular projection, where the polar areas of the sphere have not been mapped onto the two-dimensional image plane. In some cases, panoramic content may have less than 360-degree horizontal field-of-view and up to 180-degree vertical field-of-view, while otherwise have the characteristics of equirectangular projection format.

In cube map projection format, spherical video is projected onto the six faces (a.k.a. sides) of a cube. The cube map may be generated e.g. by first rendering the spherical scene six times from a viewpoint, with the views defined by an 90 degree view frustum representing each cube face. The cube sides may be frame-packed into the same frame or each cube side may be treated individually (e.g. in encoding). There are many possible orders of locating cube sides onto a frame and/or cube sides may be rotated or mirrored. The frame width and height for frame-packing may be selected to fit the cube sides "tightly" e.g. at 3×2 cube side grid or may include unused constituent frames e.g. at 4×3 cube side grid.

The equirectangular projection may defined as a process that converts any sample location within the projected picture (of the equirectangular projection format) to angular coordinates of a coordinate system. The sample location within the projected picture may be defined relative to pictureWidth and pictureHeight, which are the width and height, respectively, of the equirectangular panorama picture in samples. In the following, let the center point of a sample location along horizontal and vertical axes be denoted as i and j, respectively. The angular coordinates ($\phi$, $\theta$) for the sample location, in degrees, are given by the following equirectangular mapping equations: $\phi=(0.5-i\div pictureWidth)*360$, $\theta=(0.5-j\div pictureHeight)*180$.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane. The two-dimensional image plane can also be regarded as a geometrical structure. In other words, 360-degree content can be mapped onto a first geometrical structure and further unfolded to a second geometrical structure. However, it may be possible to directly obtain the transformation to the second geometrical structure from the original 360-degree content or from other wide view visual content. In general, an omnidirectional projection format may be defined as a format to represent (up to) 360-degree content on a two-dimensional image plane. Examples of omnidirectional projection formats include the equirectangular projection format and the cube-map projection format.

In some cases, panoramic content with 360-degree horizontal field-of-view but with less than 180-degree vertical field-of-view may be considered special cases of equirectangular projection, where the polar areas of the sphere have not been mapped onto the two-dimensional image plane. In some cases, a panoramic image may have less than 360-degree horizontal field-of-view and up to 180-degree vertical field-of-view, while otherwise has the characteristics of equirectangular projection format.

Figure 2:
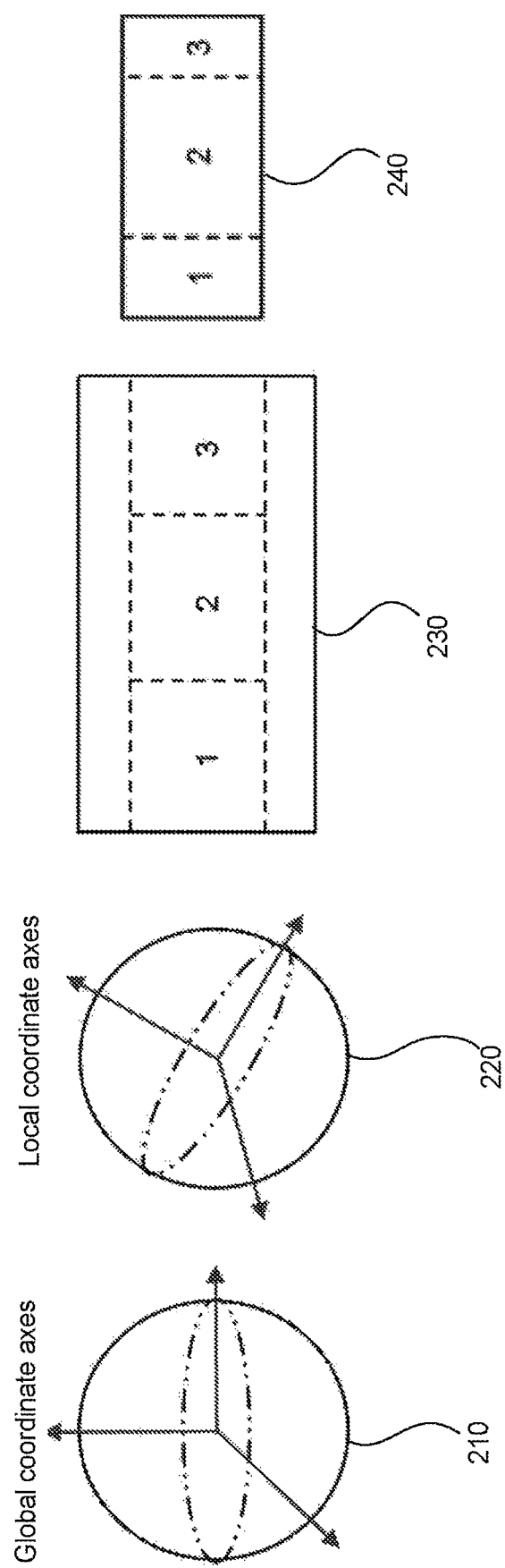
FIG. 2 shows an example of a conversion of a spherical picture to a packed picture.

FIG. 2 illustrates conversions from a spherical picture 210 to a packed picture 240 that can be used in content authoring, and the corresponding conversion from a packed picture to a spherical picture to be rendered that can be used in an OMAF player. The example shown in FIG. 2 is described for a packed picture that appears in a projected omnidirectional video track. Similar description can be derived for an image item. FIG. 2 shows a unit sphere 210 aligned with global coordinate axes and a unit sphere 220 aligned with local coordinate axes. In addition, FIG. 2 shows a projected picture 230 on which regions for region-wise packing are specified.

Figure 3:
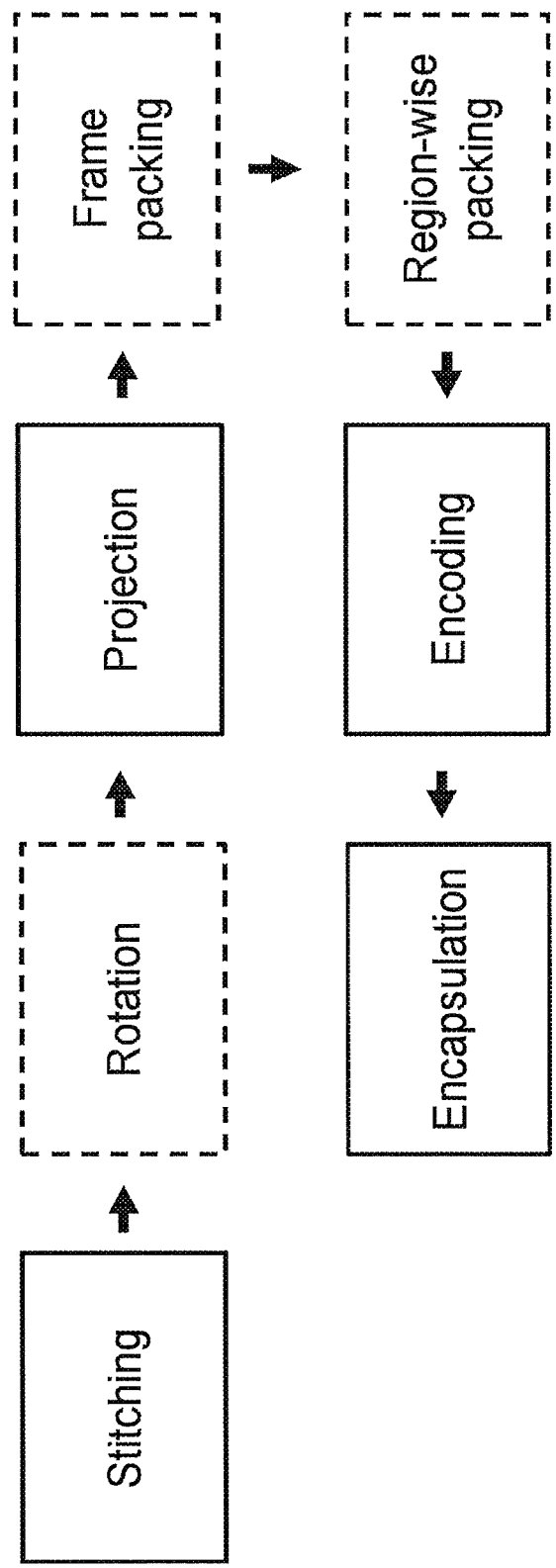
FIG. 3 shows an example of OMAF video processing steps.

An example of a OMAF video processing steps is illustrated in FIG. 3.

The projection structure (such as a sphere) may be rotated relative to the global coordinate axes. The rotation may be performed for example to achieve better compression performance based on the spatial and temporal activity of the content at certain spherical parts. Alternatively, or additionally, the rotation may be performed to adjust the rendering orientation for already encoded content. For example, if the horizon of the encoded content is not horizontal, it may be adjusted afterwards by indicating that the projection structure is rotated relative to the global coordinate axes. The projection orientation may be indicated as yaw, pitch, and roll angles that define the orientation of the projection structure or local coordinate axes relative to the global coordinate axes. The projection orientation may be included e.g. in a box in a sample entry of an ISOBMFF track for omnidirectional video.

Region-wise packing information may be encoded as metadata in or along the bitstream. For example, the packing information may comprise a region-wise mapping from a pre-defined or indicated source format to the packed frame format, e.g. from a projected picture to a packed picture, as described earlier.

Rectangular region-wise packing metadata is described next: For each region, the metadata defines a rectangle in a projected picture, the respective rectangle in the packed picture, and an optional transformation of rotation by 90, 180, or 270 degrees and/or horizontal and/or vertical mirroring. Rectangles may for example be indicated by the locations of the top-left corner and the bottom-right corner. The mapping may comprise resampling. As the sizes of the respective rectangles can differ in the projected and packed pictures, the mechanism infers region-wise resampling.

OMAF defines MPEG-DASH elements for associating various DASH elements. A SupplementalProperty element with a @schemeIdUri attribute equal to "urn:mpeg:mpegI:omaf:2018:assoc" is referred to as an association descriptor. One or more association descriptors may be present at adaptation set level, representation level, preselection level. An association descriptor included inside an adaptation set/representation/preselection element indicates that the parent element of this element's descriptor (i.e. adaptation set/representation/preselection element) is associated with one or more elements in the MPD indicated by the XPath query in the omaf2:Association element and the association type signalled by omaf2:@associationKindList.

In OMAF DASH MPD, a Viewpoint element with a @schemeIdUri attribute equal to "urn:mpeg:mpegI:omaf:2018:vwpt" is referred to as a viewpoint information (VWPT) descriptor.

At most one VWPT descriptor may be present at adaptation set level and no VWPT descriptor shall be present at any other level. When no Adaptation Set in the Media Presentation contains a VWPT descriptor, the Media Presentation is inferred to be contain only one viewpoint.

The @value Specifies the viewpoint ID of the viewpoint. The ViewPointInfo is Container element whose sub-elements and attributes provide information about the viewpoint. The ViewPointInfo@label attribute specifies a string that provides human readable label for the viewpoint. The ViewPointInfo.Position attributes of this element specify the position information for the viewpoint.

In MPEG 123, VR-IF released a Liaison statement which included the following requirements:

It shall be possible to build an interactive VR application as a set of VR 360 streams and navigation relationships and conditions between them. In a nutshell, the VR content includes sufficient information to describe all storyline paths of the interactive experience while the interactivity logic is left to the VR application.

It shall be possible to build an interactive VR application in which a specific part of the VR content loops until the user has the proper interaction required to navigate further into the storyline of the interactive VR content.

It shall be possible to build an interactive VR application by using overlay of media content (possibly with transparent elements) on top of the VR 360 content and allowing user interactions with such overlaid media.

User interactions shall be enabled thanks to the definition of sensors that are attached to specific locations in the content. The sensor definition is done within the VR content and may include information such as sensor position, size and shape. The response to the triggering of such a sensor by the user shall also be described in the sensor itself. This includes actions such as switching to a new VR stream, switching to a new overlaid media, or altering the position of an overlaid media.

Based on these requirements, there is a need to define timing information when a user switches from one visual media entity to another visual media entity; and a master timeline based on which the visual media entities are presented and are relatively switched between.

In this description term "random access" refers to the ability of a decoder to start decoding a stream at a point other than the beginning of the stream and recover an exact or approximate reconstructed media signal, such as a representation of the decoded pictures. A random access point and a recovery point may be used to characterize a random access operation. A random access point may be defined as a location in a media stream, such as an access unit or a coded picture within a video bitstream, where decoding can be initiated. A recovery point may be defined as a first location in a media stream or within the reconstructed signal characterized in that all media, such as decoded pictures, at or subsequent to a recovery point in output order are correct or approximately correct in content, when the decoding has started from the respective random access point. If the random access point is the same as the recovery point, the random access operation is instantaneous; otherwise, it may be gradual.

Random access points enable, for example, seek, fast forward play, and fast backward play operations in locally stored media streams as well as in media streaming. In contexts involving on-demand streaming, servers can respond to seek requests by transmitting data starting from the random access point that is closest to (and in many cases preceding) the requested destination of the seek operation and/or decoders can start decoding from the random access point that is closest to (and in many cases preceding) the requested destination of the seek operation. Switching between coded streams of different bit-rates is a method that is used commonly in unicast streaming to match the transmitted bitrate to the expected network throughput and to avoid congestion in the network. Switching to another stream is possible at a random access point. Furthermore, random access points enable tuning in to a broadcast or multicast. In addition, a random access point can be coded as a response to a scene cut in the source sequence or as a response to an intra picture update request.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV). In the following, the horizontal field-of-view of the viewport will be abbreviated with HFoV and, respectively, the vertical field-of-view of the viewport will be abbreviated with VFoV.

A sphere region may be defined as a region on a sphere that may be specified by four great circles or by two azimuth circles and two elevation circles and additionally by a tile angle indicating rotation along the axis originating from the sphere origin passing through the center point of the sphere region. A great circle may be defined as an intersection of the sphere and a plane that passes through the center point of the sphere. A great circle is also known as an orthodrome or Riemannian circle. An azimuth circle may be defined as a circle on the sphere connecting all points with the same azimuth value. An elevation circle may be defined as a circle on the sphere connecting all points with the same elevation value.

OMAF specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be among the following:

A recommended viewport per the director's cut, e.g., a viewport suggested according to the creative intent of the content author or content provider.

Viewpoint or Observation point is the point from which the user views the scene; it usually corresponds to a camera position. Slight head motion does not imply a different Viewpoint As used herein the term "observation point or Viewpoint" refers to a volume in a three-dimensional space for virtual reality audio/video acquisition or playback. A Viewpoint is trajectory, such as a circle, a region, or a volume, around the centre point of a device or rig used for omnidirectional audio/video acquisition and the position of the observer's head in the three-dimensional space in which the audio and video tracks are located. In some cases, an observer's head position is tracked, and the rendering is adjusted for head movements in addition to head rotations, and then an Viewpoint may be understood to be an initial or reference position of the observer's head. In implementations utilizing DASH (Dynamic adaptive streaming over HTTP), each observation point may be defined as a viewpoint by a viewpoint property descriptor. The definition may be stored in ISOBMFF or OMAF type of file format. The delivery could be HLS (HTTP Live Streaming), RTSP/RTP (Real Time Streaming Protocol/Real-time Transport Protocol) streaming in addition to DASH.

As used herein, the term "Viewpoint group" refers to one or more Viewpoints that are either spatially related or logically related. The Viewpoints in an Viewpoint group may be defined based on relative positions defined for each Viewpoint with respect to a designated origin point of the group. Each Viewpoint group may also include a default Viewpoint that reflects a default playback starting point when a user starts to consume audio-visual content in the Viewpoint group, without choosing a Viewpoint, for playback. The default Viewpoint may be the same as the designated origin point. In some embodiments, one Viewpoint may be included in multiple Viewpoint groups.

As used herein, the term "spatially related Viewpoint group" refers to Viewpoints which have content that has a spatial relationship between them. For example, content captured by VR cameras at different locations in the same basketball court or a music concert captured from different locations on the stage.

As used herein, the term "logically related Viewpoint group" refers to related Viewpoints which do not have a clear spatial relationship but are logically related. The relative position of logically related Viewpoints are described based on the creative intent. For example, two Viewpoints that are members of a logically related Viewpoint group may correspond to content from the performance area and the dressing room. Another example could be two Viewpoints from the dressing rooms of the two competing teams that form a logically related Viewpoint group to permit users to traverse between both teams to see the player reactions.

As used herein, the term "static Viewpoint" refers to an Viewpoint that remains stationary during one virtual reality audio/video acquisition and playback session. For example, a static Viewpoint may correspond with virtual reality audio/video acquisition performed by a fixed camera.

As used herein, the term "dynamic Viewpoint" refers to an Viewpoint that does not remain stationary during one virtual reality audio/video acquisition and playback session. For example, a dynamic Viewpoint may correspond with virtual reality audio/video acquisition performed by a moving camera on rails or a moving camera on a flying drone.

As used herein, the term "viewing setup" refers to a setup of one or more Viewpoints and viewing orientations. In the context of a presentation that has only one Viewpoint available, the Viewpoint need not be explicitly indicated or concluded for a viewing setup. If a presentation that has multiple Viewpoints available, the Viewpoints will be setup based on one or more Viewpoint groups, and the spatial or logical relationship between Viewpoints in each Viewpoint group will be indicated in the viewing setup.

Overlay is a term that refers to rendering of visual media over 360-degree video content. Videos and/or images may be overlaid on an omnidirectional video and/or image. The coded overlaying video can be a separate stream or part of the bitstream of the currently rendered 360-degree video/image. A omnidirectional streaming system may overlay a video/image on top of the omnidirectional video/image being rendered. The overlaid two-dimensional video/image may have a rectangular grid or a non-rectangular grid. The overlaying process may cover the overlaid video/image or a part of the video/image or there may be some level of transparency/opacity or more than one level of transparency/ opacity wherein the overlaid video/image may be seen under the overlaying video/image but with less brightness. In other words, there could be an associated level of transparency corresponding to the video/image in a foreground overlay and the video/image in the background (video/image of VR scene). The terms opacity and transparency may be used interchangeably.

The overlaid region may have one or more than one levels of transparency. For example, the overlaid region may have different parts with different levels of transparency. In accordance with an embodiment, the transparency level could be defined to be within a certain range, such as from 0 to 1 so that the smaller the value the smaller is the transparency, or vice versa.

Additionally, the content provider may choose to overlay a part of the same omnidirectional video over the current viewport of the user. The content provider may want to overlay the video based on the viewing condition of the user. For example, overlaying may be performed, if the user's viewport does not match the content provider's recommended viewport. In this case, the client player logic overlays the content provider's recommended viewport (as a preview window) on top of the current viewport of the user. It may also be possible to overlay the recommended viewport, if the user's current viewport does not match, such that the position of the overlaid video is based on the direction in which the user is viewing. For example, overlaying the recommended viewport to the left of the display, if the recommended viewport is to the left of the user's current viewport. It may also be possible to overlay the whole 360-degree video. Yet another example is to use the overlaying visual information as a guidance mechanism to guide the user towards the recommended viewport, for example guiding people who are hearing impaired.

There may be one or more conditions on when and how to display the visual overlay. Therefore, a rendering device may need to receive information which the rendering device may use to perform the overlaying as indicated by the signaled information.

One or more overlays may be carried in a single visual media track or a single image item. When more than one overlay is carried in a single track or image item, or when an overlay is carried with other media (e.g. background), a mapping of regions from the samples of the track or the image item to the overlay metadata may be provided, e.g. in or associated with the OverlayStruct.

When several tracks or image items are collectively carrying one or more overlays and/or the background visual media, a group of the tracks and image items may be indicated in a container file. For example, an entity group of ISOBMFF may be used for this purpose.

An overlay may fall outside the user's field of view (FOV), i.e., an viewport of a user becomes non-overlapping with the overlay. Depending on the specific situation, it may be desirable to continue or pause the playback of the overlay when the user is not watching the overlay. For example, it may be desirable to pause a timeline of overlay playback until the overlay overlaps again with the user's viewport. It may also be desirable to continue playback of the overlay even though the overlay is outside the user's viewport. Therefore, a mechanism that supports multiple timelines of playback which in turn enables custom overlay playback/pause independent of the base content is needed. Accordingly, a method, apparatus and computer program product are provided in accordance with an example embodiment in order to enable multiple timeline support in playback of omnidirectional media content with overlay which in turn enables customized overlay playback behavior dependent on whether the overlay overlaps with the viewport of the user.

Currently a user may switch from one overlay visual entity to another overlay visual entity by using any of the switching mechanisms provided by the client player. When the user switches from one overlay to another, the following scenarios may occur:
when overlay switching needs to be seamless (seamless switching refers to the presentation of decoded data up to a certain time t, and presentation of decoded data of another Representation from time t onwards)
when overlay switching requires the playback of "switched to"-overlay from its starting sample;
when overlay switching needs the playback of "switched to"-overlay from a certain time offset.

All the above scenarios are valid when the user switches from one viewpoint to another viewpoint. The present embodiments are targeted to these aspects.

As discussed with reference to FIG. 2 a packed picture that has been converted from a spherical picture can be used in content authoring, and the corresponding conversion from a packed picture to a spherical picture to be rendered that can be used in an OMAF player.

According to the present embodiments, the content authoring may include the following:
indicating, in a bitstream, a container file, and/or a manifest; a first presentation timeline associated with a first media component;
indicating, in a bitstream, a container file, and/or a manifest; a second presentation timeline associated with a second media component;
indicating, in a bitstream, a container file, and/or a manifest; a switching mode to a second presentation timeline associated with a second media component
indicating, in a bitstream, a container file, and/or a manifest; that the switching mode is with respect to the first presentation timeline associated with a first media component or with respect to second presentation timeline associated with a second media component.

In a further embodiment, the content authoring may also include the following:
indicating, in a bitstream, a container file, and/or a manifest; a master/global presentation timeline to be used;
in absence of a master/global presentation timeline the content author can indicate, in a bitstream, a container file, and/or a manifest; creation of a player presentation timeline to be used; wherein it is
indicated, in a bitstream, a container file, and/or a manifest; that the switching mode is with respect to the first presentation timeline associated with a first media component or with respect to second presentation timeline associated with a second media component or with respect to the master/global presentation timeline or with respect to the player presentation timeline.

According to the present embodiments, the content consumption step at the player may include the following:
parsing from a bitstream, a container file, and/or a manifest; a first presentation timeline associated with a first media component;
parsing from a bitstream, a container file, and/or a manifest; a second presentation timeline associated with a second media component;
parsing from a bitstream, a container file, and/or a manifest; a switching mode to a second presentation timeline associated with a second media component
parsing from a bitstream, a container file, and/or a manifest; that the switching mode is with respect to the first presentation timeline associated with a first media component or with respect to second presentation timeline associated with a second media component or with respect to the master/global presentation timeline or with respect to the player presentation timeline. In absence of both master/global presentation timeline or the indication to create a player presentation timeline, the player may still create and maintain its own presentation timeline and all switching modes will be with respect to the player presentation timeline.

According to a further embodiment, the content consumption step at the player may also include the following:
parsing from a bitstream, a container file, and/or a manifest; a master/global presentation timeline to be used;
in absence of a master/global presentation timeline; parsing from a bitstream, a container file, and/or a manifest; creation of a player presentation timeline to be used; in absence of both master/global presentation timeline or the indication to create a player presentation timeline (as is the situation with the previous embodiment) the player may still create and maintain its own presentation timeline, wherein it is
parsed from a bitstream, a container file, and/or a manifest; that the switching mode is with respect to the first presentation timeline associated with a first media component or with respect to second presentation timeline associated with a second media component or with respect to the master/global presentation timeline or with respect to the player presentation timeline. In absence of both master/global presentation timeline or the indication to create a player presentation timeline (as is the situation with the previous embodiment), the player may still create and maintain its own presentation timeline and all switching modes will be with respect to the player presentation timeline.

The present embodiments propose a method for signalling the switching mode when a user switches from a first media component, which may be a first overlay, to a second media component, which may be a second overlay. In an embodiment, there can be more than two media components for consumption and the modes of switching between each other may be indicated in a bitstream, a container file, and/or a manifest.

In the following examples, the switching modes are explained with two media components; a first media component, herein called as the switched-from media component, from which a user switches to a second media component, herein called as the switched-to media component.

The timeline switching mode can be one of the following:
Seamless switching;
Switch to zeroth time;
Switch to an offset time;
Switch to nearest Random-Access point.

Figure 4:
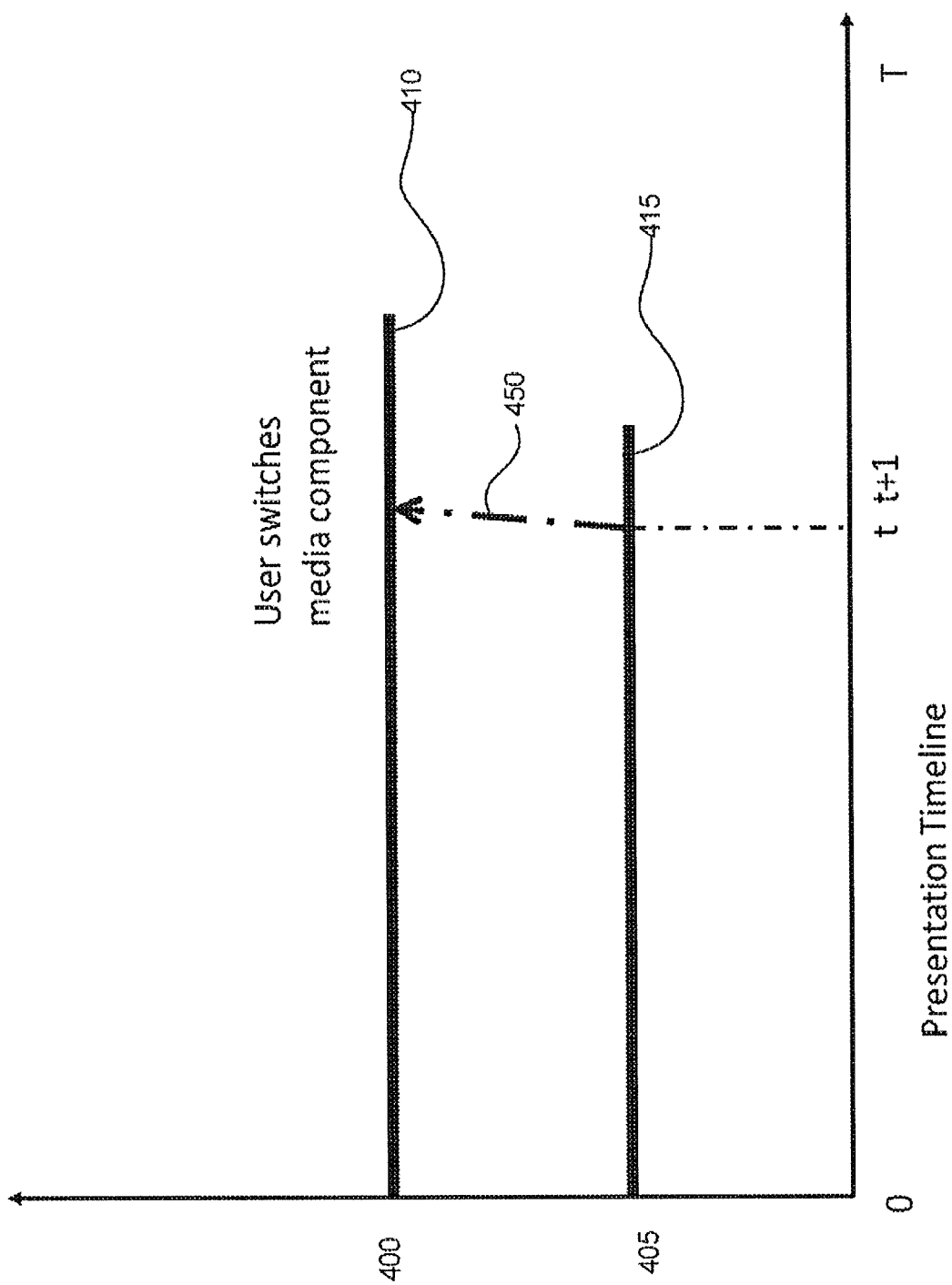
FIG. 4 shows an example of a seamless switching.

FIG. 4 illustrates a first example of a switching mode, namely a seamless switching. Seamless switching refers to the presentation of decoded data of the switched-from media component up to a certain time t, and presentation of decoded data of switched-to media component from time t onwards. FIG. 4 shows "Switch-from" media component 405 and "Switch-to" media component 400, whose timelines are shown with reference sings 415 and 410 respectively. The dashed arrow 450 indicates the time when the user performs the switching of the media component.

Figure 5:
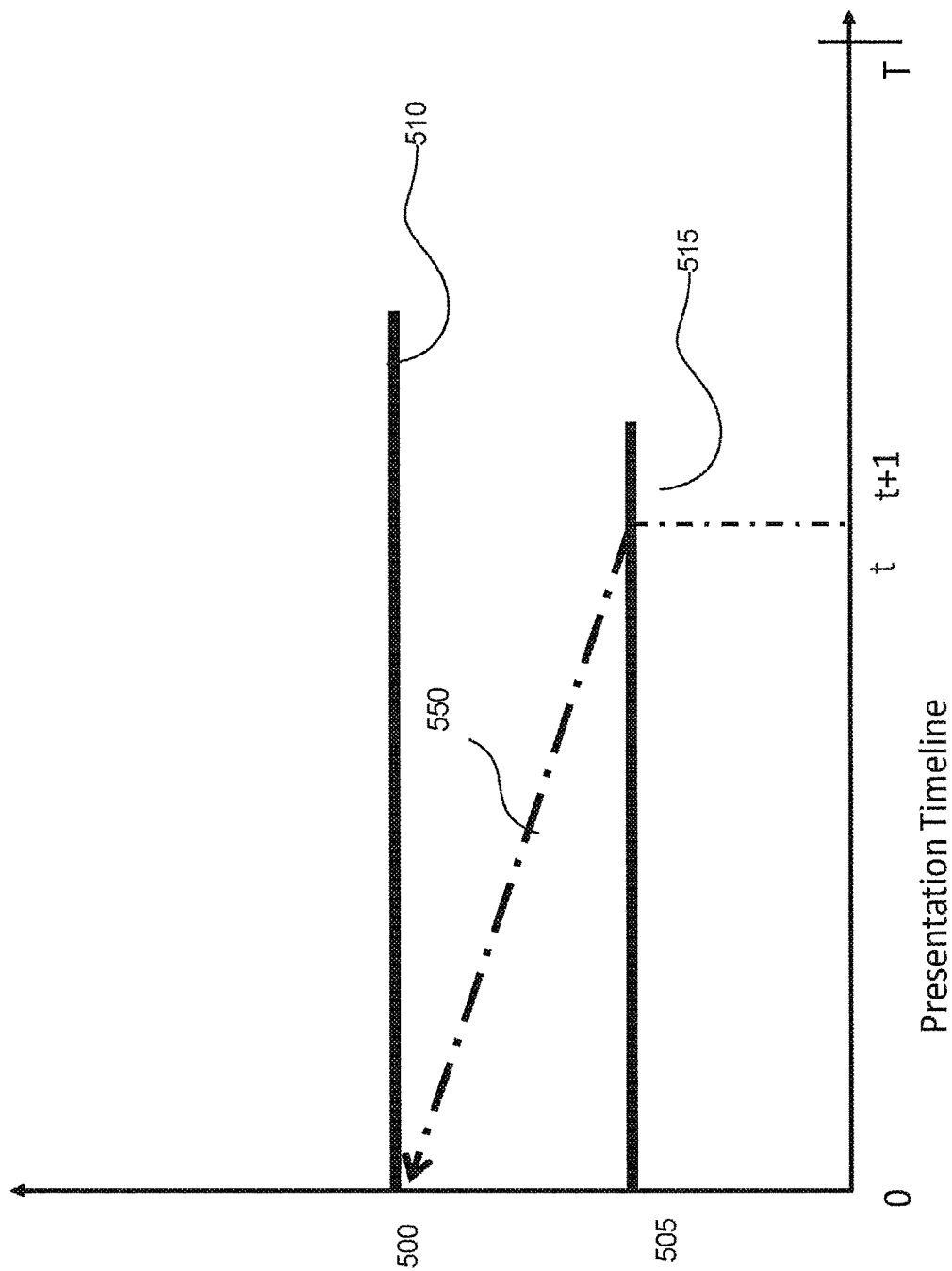
FIG. 5 shows an example of switch to zeroth time.

FIG. 5 illustrates a second example of a switching mode, namely a switch to zeroth time. The switch to zeroth time refers to the presentation of decoded data of the switched-from media component up to a certain time t, and presentation of decoded data of switched-to media component from time zero onwards. FIG. 5 shows "Switch-from" media component 505 and "Switch-to" media component 500, whose timelines are shown with reference sings 515 and 510 respectively. The dashed arrow 550 indicates the time when the user performs the switching of the media component.

Figure 6:
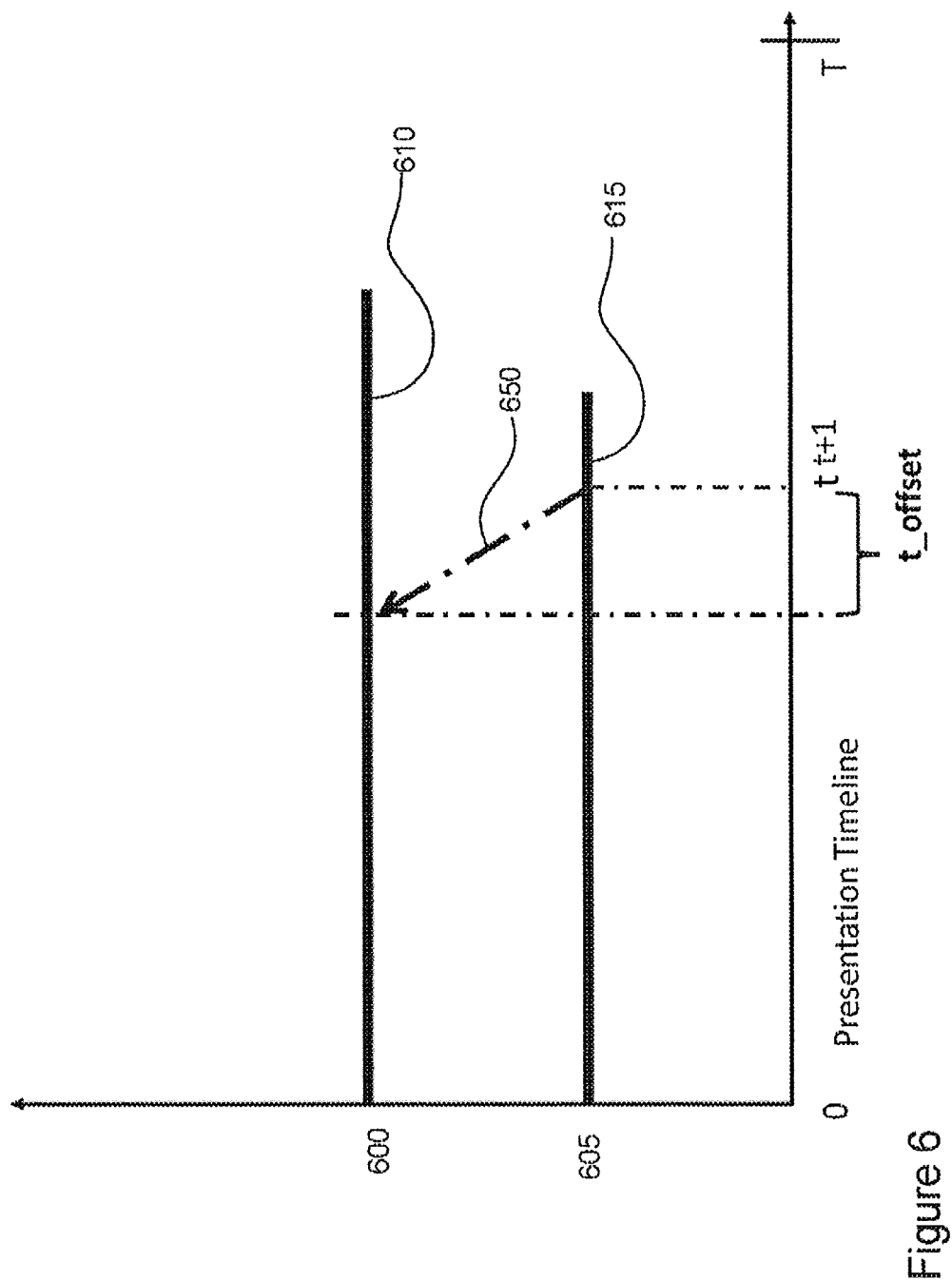
FIG. 6 shows an example of a switch to offset time.

FIG. 6 illustrates a third example of a switching mode, namely a switch to offset time. The switch to offset time refers to the presentation of decoded data of the switched-from media component up to a certain time t, and presentation of decoded data of switched-to media component from time t_offset onwards. t_offset may be greater than or less than time t. FIG. 6 shows "Switch-from" media component 605 and "Switch-to" media component 600, whose timelines are shown with reference sings 615 and 610 respectively. The dashed arrow 650 indicates the time when the user performs the switching of the media component.

The fourth example relates to Switch to nearest Random-Access point (not illustrated in Figures) that refers to the presentation of decoded data of the switched-from media component up to a certain time t, and presentation of switched-to media component from the nearest Random-Access point in the switched-to media component. "nearest" is intended in the time dimension as a time point which may be later or earlier than the time t.

According to an embodiment, an indication of default switching mode may be encoded to a bitstream, a container file, and/or a manifest to be used when switching from a switched-from media component to a switched-to media component. The default switching mode may be overridden later in presentation timeline by a different switching mode. Furthermore, the switching modes may keep changing over time and changes in switching modes may be indicated in a bitstream, a container file (e.g. in a timed metadata track of ISOBMFF), and/or a manifest. In an embodiment related to OMAF, the timeline switching can be a property of an overlay or included in the timed metadata track of the overlay (sample entry and sample) similarly for viewpoint switching. A group of viewpoints in a group may exhibit different switching behaviour over time. Additionally, there can be a correspondence structure for switching between viewpoints. At any given point in time, there can be one or more configurations for switching between viewpoints.

According to other embodiments of the invention, there can be additional signaling to indicate the retrieval mechanism of switched-to media component for the player application.

Activate the switching modes only after a certain time has elapsed in the presentation timeline;
retrieve a lower quality/resolution/frame rate content;
retrieve a spatially partial content;
retrieve an intermediate representation of switched-to media component which is made of frames predicted from switched-from media component.

In another embodiment of this invention, the switched-to media component corresponds to a number >1 of candidate viewpoints for a given switch-from media component, which may be located at different spatial positions. In this sense, this realizes a one-to-many viewpoint switch where the time instances of the >1 switched-to viewpoints are all the same (synchronized switching).

Some example embodiments are described in conjunction with ISOBMFF below. It needs to be understood that the example embodiments are provided as examples and embodiments are not limited to ISOBMFF.

In an example embodiment, the switching modes information can be carried by any other container box which has an association with the media components between which switching modes has been declared. An example data structure used for signalling switching modes is shown below.

```
aligned(8) MediaComponentsTimelineSwitch
extends EntityToGroupBox('mtls', version, flags) {
    for(i=0; i<num_entities_in_group; i++)
        unsigned int(16) ref_id[i];
        unsigned int(8) timeline_switching_mode;
        If (timeline_switching_mode == 3)
            signed int (32) toffset;
}
``` num_entities_in_group specifies the number of entity_id values mapped to this entity group ref id[i] is resolved to an entity which is either a track or image item associated with an overlay or a viewpoint or in general a media component between which a content provider enables switching and a user consuming the content is likely to switch.

In another example embodiment, ref id[i] may be resolved to an item ID indicating the ID of an overlay or a viewpoint or in general a media component between which a content provider enables switching and a user consuming the content is likely to switch.

timeline_switching_mode specifies the timeline that is to be used when switching between media component in this group.

toffset specifies the time offset to be used when switching.

The switching modes between media components can be indicated by a value, wherein, for example, Value "0" stands for seamless switching, value "1" stands for switching to zeroth sample, value "2" stands for switching to an offset time t_offset, value "3" stands for switching to nearest Random-Access point. It is appreciated that any other values can be used instead.

According to an embodiment, TrackGroupBox or the EntityToGroupBox of ISOBMFF can be used as a container for containing switching modes between different media components. One example of signalling switching modes with EntityToGroupBox for grouping overlays which are intended to be presented as a user-switchable alternative for another overlay in the same entity group.

EntityToGroupBox with grouping_type equal to 'oval' specifies tracks and image items containing overlays intended to be presented as a user-switchable alternative for another overlay in the same entity group.

```
aligned(8) class OverlaySwitchAlternativesBox(version, flags)
extends EntityToGroupBox('oval', version, flags) {
    // conditionally optional
    for(i=0; i<num_entities_in_group; i++)
        unsigned int(16) ref_overlay_id[i];
        unsigned int(8) timeline_switching_mode;
        If (timeline_switching_mode == 3)
            signed int (32) toffset;
}
``` ref overlay_id[i] specifies the overlay_id from the track or image item identified by i-th entity_id that is a switchable overlay in this group. The i-th referenced track or image item shall have overlay_id equal to ref_overlay_id[i] present. If each of the tracks and image items identified by the entity_id values of this entity group contains exactly one overlay, ref_layer_id[i] syntax elements may or may not be present. Otherwise, ref_layer_id[i] syntax elements shall be present.

The semantics of timeline_switching_mode and toffset are as above.

Similar embodiments apply to group of Viewpoints which can be switched between each other. One example embodiment with group of viewpoints which are intended to be presented as a user-switchable alternative for another viewpoint.

EntityToGroupBox with grouping_type equal to 'visw' specifies tracks and image items containing viewpoints intended to be presented as a user-switchable alternative for another viewpoint in the same entity group.

```
aligned(8) class ViewpointSwitchAlternativesBox(version, flags)
extends EntityToGroupBox('visw', version, flags) {
    // conditionally optional
    for(i=0; i<num_entities_in_group; i++)
        unsigned int(16) ref_viewpoint_id[i];
        unsigned int(8) timeline_switching_mode;
        If (timeline_switching_mode == 3)
            signed int (32) toffset;
}
``` ref_viewpoint_id[i] specifies the viewpoint_id from the track or image item identified by i-the entity_id that is a switchable viewpoint in this group. The i-th referenced track or image item shall have viewpoint_id equal to ref_viewpoint_id[i] present. If each of the tracks and image items identified by the entity_id values of this entity group contains exactly one viewpoint, ref_viewpoint_id[i] syntax elements may or may not be present. Otherwise, ref_layer_id[i] syntax elements shall be present.

In another example embodiment, the switching modes between viewpoints can be part of the ViewpointGroupStruct( )

```
aligned(8) class ViewpointGroupStruct( ) {
    unsigned int(8) vwpt_group_id;
    string vwpt_group_description;
    for(i=0; i<num_viewpoints_in_group-1; i++)
        unsigned int(16) ref_viewpoint_id[i];
        unsigned int(8) timeline_switching_mode;
        If (timeline_switching_mode == 3)
            signed int (32) toffset;
}
```

ViewpointGroupStruct( ) provides viewpoint group information vwpt_group_id indicates the identifier of a viewpoint group. All viewpoints in a viewpoint group share a common reference coordinate system.

It is appreciated that when two viewpoints have different values of vwpt_group_id, their position coordinates are not comparable, because the viewpoints belong to different coordinate systems.

vwpt_group_description is a null-terminated UTF-8 string which indicates the description of a viewpoint group. A null string is allowed.

It is appreciated that an OMAF player is expected to start with the initial viewpoint timed metadata. Subsequently, if the user wishes to switch to a viewpoint group and the initial viewpoint information is not present, the OMAF player is expected to switch to the viewpoint with the least value of the viewpoint identifier in the viewpoint group.

num_viewpoints_in_group indicates the number of viewpoints in the group that can be switched-to from the current viewpoint ref_viewpoint_id[i] specifies the viewpoint_id of the viewpoint in the group that can be switched-to from the current viewpoint and the corresponding switching mode defined to.

The semantics of timeline_switching_mode and toffset are as above.

In another example embodiment, the switching modes between viewpoints can be signaled in a timed metadata track having a sample entry 'vpts', named as viewpoint timelines switching timed metadata track.

Sample Entry Syntax

```
class vptsSampleEntry( ) extends MetaDataSampleEntry ('vpts') {
    unsigned int(32) num_viewpoint_timeline_collections;
}
Sample syntax
class vptsSample( ) {
    for (i = 0; i < num_viewpoint_timeline_collections; i++) {
        unsigned int(8) num_viewpoints_in_this_collection[i];
        unsigned int(8) timeline_switching_mode;
        If (timeline_switching_mode == 3)
            signed int (32) toffset;
        for (j=0;j<num_viewpoints_in_this_collection[i];j++)
            unsigned int(32) viewpoint_id[i][j];
    }
}
``` num_viewpoint_timeline_collections indicates the number of viewpoint timeline collections for which timeline switching modes is signalled in the samples to which this sample entry applies.

num_viewpoints_in_this_collection[i] indicates the number of viewpoints in the i-th viewpoint timeline collection. When a user switches between any viewpoint in a given viewpoint timeline collection then the player is expected to follow the timeline_switching_mode indicated fort that collection.

viewpoint_id[i][j] indicates the viewpoint ID of the j-th viewpoint in the i-th viewpoint timeline collection.

Indicating Master Timeline in ISOBMFF

In an example embodiment, the master timeline of the presentation can be signaled as part of a PresentationTimelineBox.

EditBox of ISOBMFF is a container box for containing a mapping from the track's media timeline to the presentation timeline (shared among the tracks). EditBox may be used as a container for associating a presentation timeline to a track. One example EditBox is provided below:

Box Type: 'prtl'
Container: EditBox
Mandatory: No
Quantity: Zero or one

When present, the EditBox assigns a track to a particular presentation timeline identified by a timeline identifier provided in the box. When the EditBox is not present, the track is implicitly assigned to the presentation timeline with timeline identifier equal to 0.

During playback of omnidirectional media content, tracks associated with the same presentation timeline are played synchronously. Presentation timelines with different timeline identifiers may be paced unsynchronously and may have different playback states (e.g., one may be paused, while other may be in regular playback mode).

In some embodiments, an example PresentationTimelineBox specifies the presentation timeline but does not indicate how the presentation timelines are controlled. An example PresentationTimelineBox is provided below:

```
aligned(8) class PresentationTimelineBox
    extends FullBox('prtl', version, flags) {
    unsigned int(32)   timeline_id;
```

```
    if (flags & 1)
        master_timeline_id;
}
```

(flags & 1) equal to 1 specifies that when the track becomes active (e.g. visible), its presentation time is set to the current presentation time of the timeline indentified by master_timeline_id. A specific timeline_id value (e.g.) is reserved for indicating the timeline of the entire presentation. Thus, master_timeline_id equal to 0 specifies that the track is synchronized to the timeline of the entire presentation.

(flags & 2) equal to 2 specifies that the presentation time of the track is paused when it is not active and resumed when it becomes active.

(flags & 4) equal to 4 specifies that the presentation time of the track is started from 0 when the track becomes active (e.g. visible).

(flags & 8) equal to 8 specifies that the presentation time of the track is started from the beginning of the first non-empty entry in the EditListBox when the track becomes active (e.g. visible).

This embodiment can be used not only for switching of overlays but also switching of viewpoints.

timeline_id provides a timeline identifier for the presentation timeline to which this track is assigned.

Regardless of the file format used for the overlay or the viewpoint, the apparatus of an example embodiment may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, etc. Alternatively, the apparatus may be embodied by a virtual reality system, such as a virtual reality headset capable of receiving one or more data streams and rendering visual and audiovisual content that can be presented to a user.

Indicating Switching Modes in MPEG-DASH

Some example embodiments are described in conjunction with MPEG-DASH below. It needs to be understood that the example embodiments are provided as examples and embodiments are not limited to MPEG-DASH.

According to an embodiment, the switching modes information can be carried in an MPD with either a SupplementalProperty and/or EssentialProperty descriptor which has an association/relationship with the media components between which switching modes has been declared.

In an example embodiment, the association descriptor of OMAF may indicate the association between overlays which are consumed as alternatives for presentation with the @associationKindList indicating the relationship between the overlays which are switchable by the user.

According to an embodiment, a new attribute called the @switchingModes is defined, which indicates the switching modes between the overlays listed by the @associationKindList. The values of @switchingModes is the list of the switching mode values mentioned above.

In an example embodiment, rather than defining an attribute @switchingMode, a new element SwitchingModes is defined to be carried within a descriptor and used with the association descriptor of OMAF similarly to what is described above. The SwitchingModes element may include SwitchingModes@mode attribute that is a list of switching mode values mentioned above and another attribute SwitchingModes @ offset that indicates the offset to be used in case when the @SwitchingModes has the value 2.

In another example embodiment, the Viewpoint information descriptor may indicate the switchable modes between viewpoints. A new attribute ViewPointInfo@switchingModes is defined, which indicates the switching modes between the viewpoints. The values of ViewPointInfo@switchingModes is same as defined above.

According to an embodiment, an element comprising timeline information is authored into an MPD and/or parsed from an MPD. The element may for example be an essential descriptor element. The element may for example be contained in an AdaptationSet element (hence describing all Representations of the Adaptation Set) or in a Representation element (hence describing the Representation). The element comprises but is not limited to one or more of the following:

Presentation timeline identifier. In an embodiment, an MPD author sets this value equal to the timeline_id of the PresentationTimelineBox.

Indication that when the Representation becomes active (e.g. visible), its presentation time is set to the current presentation time of the master timeline. In an embodiment, the master timeline is aligned with the Media Presentation timeline inferred from the MPD. In an embodiment, a master timeline may be indicated e.g. by including its identifier into the element.

Indication that the presentation time of the Representation is paused when it is not active and resumed when it becomes active.

Indication that the presentation time of the Representation is started from 0 when the track becomes active (e.g. visible).

Indication that the presentation time of the Representation is started from the earliest presentation time of its media samples when the Representation becomes active (e.g. visible). In an embodiment, an MPD author sets this value to presentation time of the first non-empty entry in the EditListBox.

Indication that the Representation is repeated or looped, i.e. indication that when the presentation time of the Representation has reached its largest presentation time, it is reset to a value that may be inferred to be equal to 0 or may be indicated in th element. In other words, the Representation is repeated seamlessly. In an embodiment, an MPD author sets this indication when (flags & 1) in the EditListBox is equal to 1.

According to an embodiment, a DASH client concludes if the presentation time for an associated Representation follows the Media Presentation timeline inferred from the MPD. The conclusion may be based on information according to any embodiment above. For example, an element comprising timeline information as described is parsed from an MPD to conclude whether the associated Representation follows the Media Presentation timeline inferred from the MPD. When the Representation follows the Media Presentation timeline inferred from the MPD, the (Sub)segment requests are issued conventionally. When the Representation does not follow the Media Presentation timeline inferred from the MPD, a time range for the timeline of the Representation is derived so that the time range corresponds to the next (Sub)segment request(s) to be made. For example, when the presentation time for the Representation has been reset (e.g. due to the activation of the Representation or due to looping), the time range may differ from a respective time range for the next (Sub)segment request(s) according to Media Presentation timeline inferred from the MPD. The time range may further be converted to a Segment index and/or byte range for a (Sub)segment. A request, such as an HTTP GET request, based on the time range may then be issued.

Indicating MasterTimeline in MPEG-DASH

According to an embodiment, the creation of a playback timeline may can be carried in an MPD either at the MPD level and/or at a period level and/or at an Adaptation Set level and/or at an RepresentationSet level.

In an example embodiment, MPD@masterTimelineID element indicates the ID of the master timeline for all the Period and Adaptation Sets in the MPD. A new MPD with a different value of @masterTimelineID indicates that the media represented in new MPD has a different master timeline. A new MPD with the same value of @masterTimelineID indicates that the media represented in new MPD has the same master timeline as the previous MPD (Example after a MPD refresh).

The presence of @masterTimelineID element indicates the player that a new timeline needs to be created by the player and the media respresented by the MPD follows the master timeline.

In another example embodiment, Period@masterTimelineID element indicates the ID of the master timeline for the given Period.

In another example embodiment, when an Adaptation Set containing an first viewpoint is associated with one or more Adaptation Sets containing a second or more viewpoints, an association descriptor shall be present as a child element of the AdaptationSet element containing the first viewpoint.

In this case the association descriptor shall include both of the following:

An XPath string in the Association element which evaluates to one or more AdaptationSet element(s) containing second or more viewpoints.

Only one 'vpts' value for Association@associationKindList attribute of the Association element. In this case:

When Association@associationKindList includes one 'vpts' value and the number of element(s) the XPath string in the Association element above evaluates to is greater than 1, the viewpoint timeline switching applies to all the viewpoints.

When Association@associationKindList includes one 'vpts' value and the number of elements the XPath string in the Association element above evaluates to is equal to 1, the viewpoint timeline switching applies individually to the other viewpoint.

There can be multiple such association descriptors present inside an Adaptation Set containing a viewpoint.

When an Adaptation Set containing an viewpoint is associated with one or more Adaptation Set(s) containing other viewpoints as described above, they are intended to be switched between each other based on a given switching mode.

In an example embodiment, the Association@mastertimelineID element indicates the master timeline ID of the visual medias which are associated by the association descriptor with Association @ associationKindList indicated by 'vets'.

Figures 7, 8:
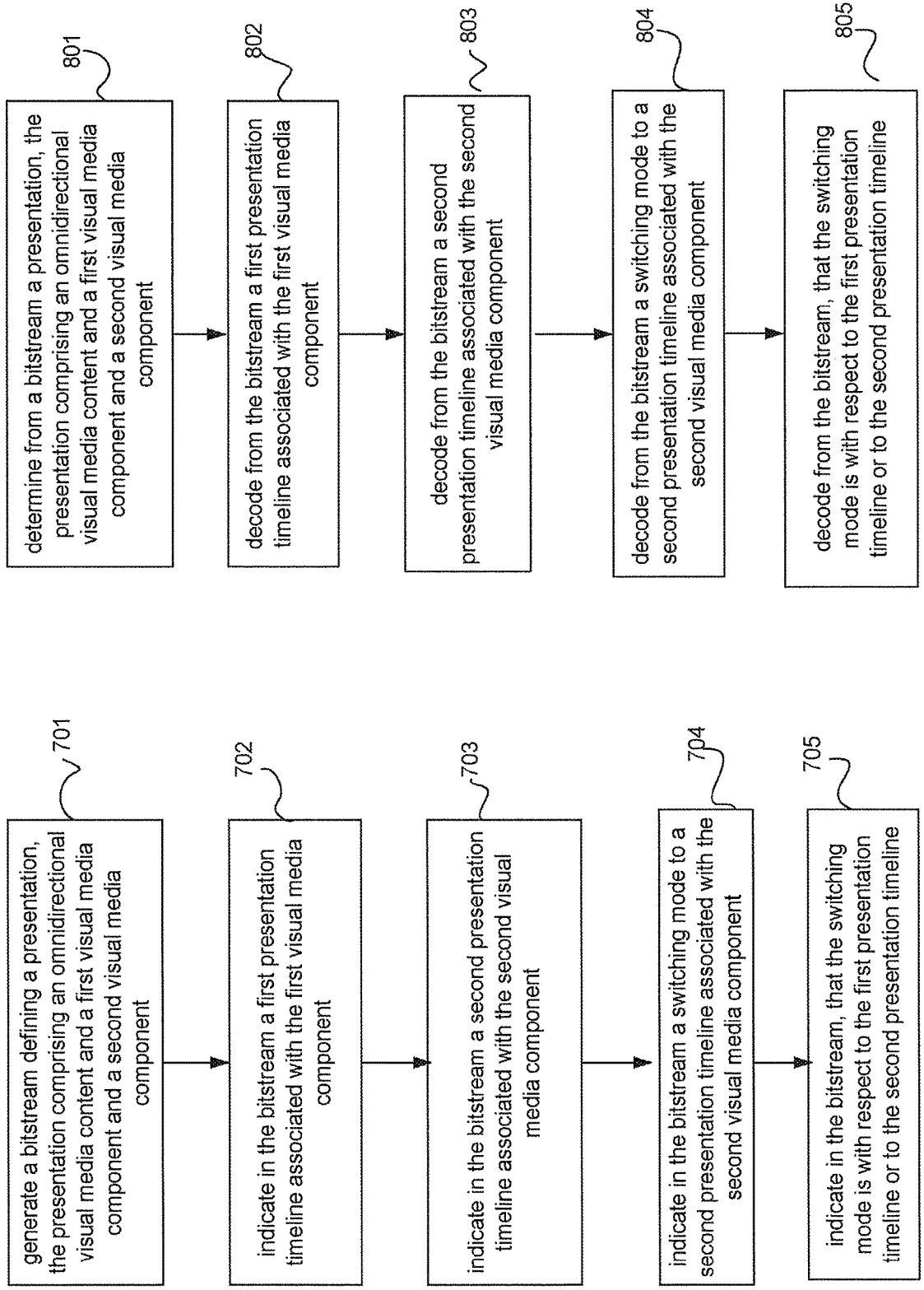
FIG. 7 is a flowchart illustrating a method according to an embodiment.
FIG. 8 is a flowchart illustrating a method according to another embodiment.

FIG. 7 is a flowchart illustrating a method according to an embodiment. A method for encoding comprises generating 701 a bitstream defining a presentation, the presentation comprising an omnidirectional visual media content and a first visual media component and a second visual media component; indicating 702 in the bitstream a first presentation timeline associated with the first visual media component; indicating 703 in the bitstream a second presentation timeline associated with the second visual media component; indicating 704 in the bitstream a switching mode to a second presentation timeline associated with the second visual media component; and indicating 705 in the bitstream, that the switching mode is with respect to the first presentation timeline or to the second presentation timeline.

An apparatus according to an embodiment comprises means for generating a bitstream defining a presentation, the presentation comprising an omnidirectional visual media content and a first visual media component and a second visual media component; means for indicating in the bitstream a first presentation timeline associated with the first visual media component; means for indicating in the bitstream a second presentation timeline associated with the second visual media component; means for indicating in the bitstream a switching mode to a second presentation timeline associated with the second visual media component; and means for indicating in the bitstream, that the switching mode is with respect to the first presentation timeline or to the second presentation timeline. The means comprises a processor, a memory, and a computer program code residing in the memory, wherein the processor may further comprise a processor circuitry.

FIG. 8 is a flowchart illustrating a method according to another embodiment. A method for decoding comprises determining 801 from a bitstream a presentation, the presentation comprising an omnidirectional visual media content and a first visual media component and a second visual media component; decoding 802 from the bitstream a first presentation timeline associated with the first visual media component; decoding 803 from the bitstream a second presentation timeline associated with the second visual media component; decoding 804 from the bitstream a switching mode to a second presentation timeline associated with the second visual media component; and decoding 805 from the bitstream, that the switching mode is with respect to the first presentation timeline or to the second presentation timeline.

An apparatus according to an embodiment comprises means for determining from a bitstream a presentation, the presentation comprising an omnidirectional visual media content and a first visual media component and a second visual media component; means for decoding from the bitstream a first presentation timeline associated with the first visual media component; means for decoding from the bitstream a second presentation timeline associated with the second visual media component; means for decoding from the bitstream a switching mode to a second presentation timeline associated with the second visual media component; and means for decoding from the bitstream, that the switching mode is with respect to the first presentation timeline or to the second presentation timeline. The means comprises a processor, a memory, and a computer program code residing in the memory, wherein the processor may further comprise a processor circuitry.

Figure 9:
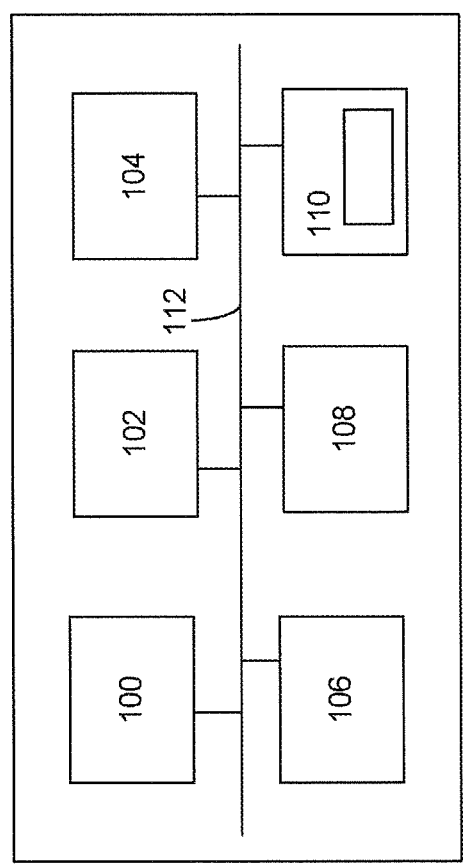
FIG. 9 shows an apparatus according to an embodiment.

An example of a data processing system for an apparatus is illustrated in FIG. 9. Several functionalities can be carried out with a single physical device, e.g. all calculation procedures can be performed in a single processor if desired. The data processing system comprises a main processing unit 100, a memory 102, a storage device 104, an input device 106, an output device 108, and a graphics subsystem 110, which are all connected to each other via a data bus 112.

The main processing unit 100 is a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100.

Computer program code resides in the memory 102 for implementing, for example the method according to flowcharts of FIG. 7 or 8. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

In the above, some embodiments have been described in relation to DASH or MPEG-DASH. It needs to be understood that embodiments could be similarly realized with any other similar streaming system, and/or any similar protocols as those used in DASH, and/or any similar segment and/or manifest formats as those used in DASH, and/or any similar client operation as that of a DASH client. For example, some embodiments could be realized with the M3U manifest format. Moreover, embodiments are not limited to media descriptions for streaming but also apply for other types of media applications, such as conferencing. For example, embodiments may be realized using the IETF SDP protocol as a media description.

In the above, some embodiments have been described in relation to ISOBMFF. It needs to be understood that embodiments could be similarly realized with any other file format, such as Matroska.

It is also noted herein that while the above describes example embodiments, these descriptions should not be viewed in a limiting sense. Rather, there are several variations and modifications, which may be made without departing from the scope of the present disclosure as, defined in the appended claims.

What is claimed is:

1. A method, comprising:
generating a bitstream defining a presentation, the presentation comprising an omnidirectional visual media content and a first visual media component and a second visual media component;
indicating in the bitstream a first presentation timeline associated with the first visual media component;
indicating in the bitstream a second presentation timeline associated with the second visual media component;
indicating in the bitstream a switching mode with respect to the first presentation timeline associated with the first visual media component, or with respect to the second presentation timeline associated with the second visual media component, the switching mode being indicated dependent on a viewpoint of a user viewing the presentation;
wherein the switching mode provides an indication of switching to the first visual media component or to the second visual media component, the first visual media component corresponding to content captured from at least a first omnidirectional camera in a first location, and the second visual media component corresponding to content captured from at least a second omnidirectional camera in a second location; and
indicating in the bitstream a time offset variable that specifies a time offset to be used when switching to a viewpoint identifier.

2. The method of claim 1, wherein switching from the first visual media component to the second visual media component comprises at least one of a switch:
from a first overlay to a second overlay, where both the first overlay and the second overlay are within the same viewpoint;
from a first overlay to a second overlay, where both the first overlay and the second overlay are in different viewpoints;
from a first viewpoint to a second viewpoint;
from a first overlay in a first viewpoint to a second viewpoint; or
from a first viewpoint to second overlay in a second viewpoint.

3. The method of claim 1, further comprising:
indicating an activation of a switch from one viewpoint to another viewpoint using an overlay or without using an overlay.

4. The method of claim 3, further comprising:
indicating the switch from one viewpoint to another viewpoint within a timed metadata track of the overlay, the timed metadata track comprising a sample entry and sample.

5. The method of claim 1, further comprising:
indicating an activating of a switch to the first visual media component or to the second visual media component, independent of a type of device output display, when an overlay is not used.

6. The method of claim 1, wherein the switching comprises a spatial switch from a first region in a first viewpoint to a second region in a second viewpoint.

7. The method of claim 1, wherein the switching comprises a timeline switch from a first time in a first viewpoint to a second time in a second viewpoint, where the second time is less than the first time, the second time is equal to the first time, or the second time is greater than the first time.

8. The method of claim 7, further comprising:
indicating the timeline switch in a timed metadata track of an overlay, the timed metadata track comprising a sample entry and sample.

9. A non-transitory computer-readable medium comprising program instructions stored thereon which are configured to, when executed with at least one processor, cause the at least one processor to perform the method of claim 1.

10. A method, comprising:
determining from a bitstream a presentation, the presentation comprising an omnidirectional visual media content and a first visual media component and a second visual media component;
decoding from the bitstream a first presentation timeline associated with the first visual media component;
decoding from the bitstream a second presentation timeline associated with the second visual media component;
decoding from the bitstream a switching mode with respect to the first presentation timeline associated with the first visual media component, or with respect to the second presentation timeline associated with the second visual media component, the switching mode being indicated dependent on a viewpoint of a user viewing the presentation;
wherein the switching mode provides an indication of switching to the first visual media component or to the second visual media component, the first visual media component corresponding to content captured from at least a first omnidirectional camera in a first location, and the second visual media component corresponding to content captured from at least a second omnidirectional camera in a second location; and
decoding from the bitstream a time offset variable that specifies a time offset to be used when switching to a viewpoint identifier.

11. The method of claim 10, wherein switching from the first visual media component to the second visual media component comprises at least one of a switch:
from a first overlay to a second overlay, where both the first overlay and the second overlay are within the same viewpoint;
from a first overlay to a second overlay, where both the first overlay and the second overlay are in different viewpoints;
from a first viewpoint to a second viewpoint;
from a first overlay in a first viewpoint to a second viewpoint; or
from a first viewpoint to second overlay in a second viewpoint.

12. The method of claim 10, further comprising:
activating a switch from one viewpoint to another viewpoint using an overlay or without using an overlay.

13. The method of claim 12, further comprising:
decoding the switch from one viewpoint to another viewpoint from a timed metadata track of the overlay, the timed metadata track comprising a sample entry and sample.

14. The method of claim 10, further comprising:
activating a switch to the first visual media component or to the second visual media component, independent of a type of device output display, when an overlay is not used.

15. The method of claim 10, wherein the switching comprises a spatial switch from a first region in a first viewpoint to a second region in a second viewpoint.

16. The method of claim 10, wherein the switching comprises a timeline switch from a first time in a first viewpoint to a second time in a second viewpoint, where the second time is less than the first time, the second time is equal to the first time, or the second time is greater than the first time.

17. The method of claim 16, further comprising:
decoding the timeline switch from a timed metadata track of an overlay, the timed metadata track comprising a sample entry and sample.

18. A non-transitory computer-readable medium comprising program instructions stored thereon which are configured to, when executed with at least one processor, cause the at least one processor to perform the method of claim 1.

19. An apparatus comprising:
at least one processor; and
at least one non-transitory memory including computer program code;
wherein the at least one memory and the computer program code are configured to, with the at least one processor, cause the apparatus at least to:
generate a bitstream defining a presentation, the presentation comprising an omnidirectional visual media content and a first visual media component and a second visual media component;
indicate in the bitstream a first presentation timeline associated with the first visual media component;
indicate in the bitstream a second presentation timeline associated with the second visual media component;
indicate in the bitstream a switching mode with respect to the first presentation timeline associated with the first visual media component, or with respect to the second presentation timeline associated with the second visual media component, the switching mode being indicated dependent on a viewpoint of a user viewing the presentation;
wherein the switching mode provides an indication of switching to the first visual media component or to the second visual media component, the first visual media component corresponding to content captured from at least a first omnidirectional camera in a first location, and the second visual media component corresponding to content captured from at least a second omnidirectional camera in a second location; and
indicate in the bitstream a time offset variable that specifies a time offset to be used when switching to a viewpoint identifier.

20. An apparatus comprising:
at least one processor; and
at least one non-transitory memory including computer program code;
wherein the at least one memory and the computer program code are configured to, with the at least one processor, cause the apparatus at least to:
determine from a bitstream a presentation, the presentation comprising an omnidirectional visual media content and a first visual media component and a second visual media component;
decode from the bitstream a first presentation timeline associated with the first visual media component;
decode from the bitstream a second presentation timeline associated with the second visual media component;
decode from the bitstream a switching mode with respect to the first presentation timeline associated with the first visual media component, or with respect to the second presentation timeline associated with the second visual media component, the switching mode being indicated dependent on a viewpoint of a user viewing the presentation;
wherein the switching mode provides an indication of switching to the first visual media component or to the second visual media component, the first visual media component corresponding to content captured from at least a first omnidirectional camera in a first location, and the second visual media component corresponding to content captured from at least a second omnidirectional camera in a second location; and
decode from the bitstream a time offset variable that specifies a time offset to be used when switching to a viewpoint identifier.

21. The method of claim 1, wherein the time offset variable specifies a time to be used when switching to a destination viewpoint identifier.

22. The method of claim 1, wherein the time offset variable specifies the time offset to be used when switching to a destination viewpoint identifier relative to a current viewpoint identifier.

23. The method of claim 10, wherein the time offset variable specifies a time to be used when switching to a destination viewpoint identifier.

24. The method of claim 10, wherein the time offset variable specifies the time offset to be used when switching to a destination viewpoint identifier relative to a current viewpoint identifier.

25. The apparatus of claim 19, wherein the time offset variable specifies a time to be used when switching to a destination viewpoint identifier.

26. The apparatus of claim 19, wherein the time offset variable specifies the time offset to be used when switching to a destination viewpoint identifier relative to a current viewpoint identifier.

27. The apparatus of claim 20, wherein the time offset variable specifies a time to be used when switching to a destination viewpoint identifier.

28. The apparatus of claim 20, wherein the time offset variable specifies the time offset to be used when switching to a destination viewpoint identifier relative to a current viewpoint identifier.

* * * * *